May 16, 1967  YASUTO TERAZAWA  3,319,611
INTAKE GAS HEATING MEANS FOR A ROTARY PISTON ENGINE
Filed Aug. 9, 1965
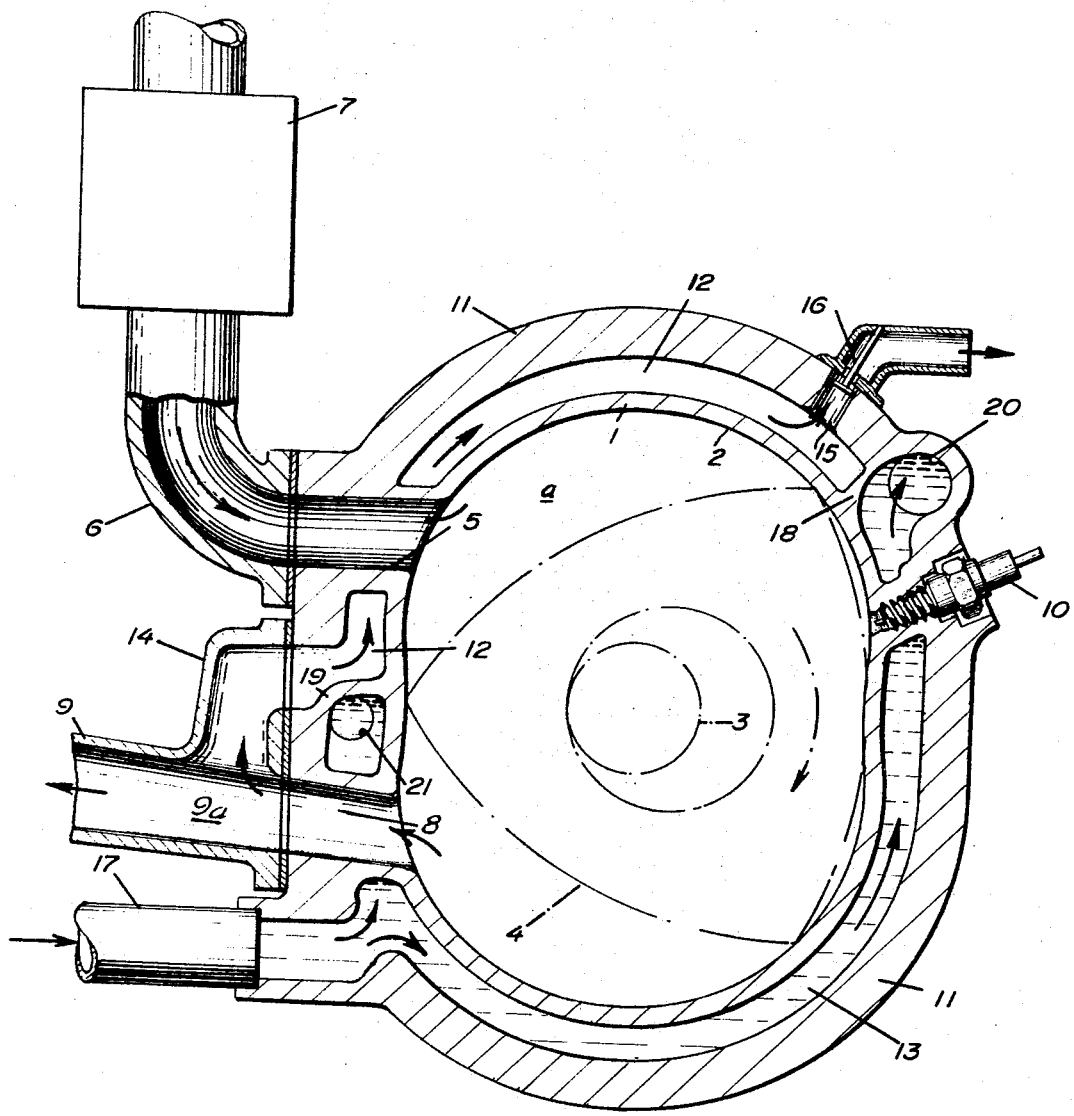
Yasuto Terazawa
INVENTOR
BY Wenderoth, Lind and Ponack
ATTORNEYS 3,319,611
Patented May 16, 1967

3,319,611
INTAKE GAS HEATING MEANS FOR A ROTARY PISTON ENGINE
Yasuto Terazawa, Aki-gun, Hiroshima-ken, Japan, assignor to Toyo Kogyo Company Limited, Aki-gun, Hiroshima-ken, Japan
Filed Aug. 9, 1965, Ser. No. 478,360
Claims priority, application Japan, Aug. 13, 1964, 39/46,735
2 Claims. (Cl. 123—8)

The present invention relates to a gas heating means for heating gases drawn into rotary piston internal combustion engines.

Rotary piston type internal combustion engines having a combustion chamber within which a generally polygonal shaped piston rotates with the apexes in contact with the internal peripheral wall of the combustion chamber, are well known. The disadvantage of this type of engine is that a local area of the housing of the engine adjacent the gas intake port is subject to a constant relatively low temperature due to the intake of fresh gases, and in other areas is subject to heat resulting from combustion. This results in deformation of the housing due to the local strain thereon and impairs good engine performance.

It is an object of the present invention to overcome this disadvantage by providing an improved intake gas heating means which is structurally simple, and functionally efficient, and which is particularly suited for the above described type of rotary piston internal combustion engine.

Another object of the invention is to provide a heating means for heating a localized area of the engine housing where the interior face thereof is exposed to the relatively cold gases, by applying heated exhaust gases thereto, whereby the cold intake gases are heated in the intake chamber.

A further object of the invention is to provide a heating means of the above character controlled by valve means to modulate the heating temperature.

Other objects and advantages will become apparent from the following detailed description and from the accompanying drawing which is a sectional elevation of a rotary piston internal combustion engine provided with a heating means according to the present invention.

As shown in the drawing, the engine to which the heating means of the invention is applied comprises an annular casing 1 forming the housing of the engine and having an internal peripheral wall 2 which is trochoid-shaped so as to define a combustion chamber therein. The annular casing 1 is closed by side walls (not shown) secured to the opposite ends thereof so as to produce air tight chambers adapted for the intake and compression of the fuel gases by rotating a rotary piston as hereinafter described. Extending through the center of the combustion chamber is a crankshaft 3 which has eccentrically rotatably mounted thereon a triangular rotary piston 4 having a plurality of apexes which are always in contact with the internal peripheral wall of the annular casing 1 within the combustion chamber so that the said apexes are moved along the trochoid-shaped internal peripheral face of the casing during rotation of the piston 4. Opening into the combustion chamber at an appropriate position around the annular casing 1 is an intake port 5 to which one end of an intake manifold 6 is connected, the other end thereof being connected to a carburetor 7. Appropriately spaced from the intake port 5 is an exhaust port 8 opening through the annular casing 1 and an end of an exhaust manifold 9 is connected thereto. Positioned at an appropriate position around the annular casing is a spark plug 10 for firing the compressed gas in the combustion chamber. Formed integrally with the annular casing is a fluid jacket 11 and defined between the casing and the jacket are separate fluid chambers 12 and 13. The chamber 12 extends along the area of the casing where the casing is locally exposed to the relatively cold intake gases and chamber 12 is connected at one end thereof to the exhaust manifold 9 through a branch passage 14. Opening out of the chamber 12 at a point spaced around the chamber from the exhaust port is an exhaust outlet 15 for exhausting fluid from the chamber 12. The outlet 15 may be provided with a manually or automatically operated valve means 16 for controlling the exhaust of fluid from chamber 12. The chamber 13 extends along the area of the casing where the casing is exposed to the heat of combustion, and is connected at an appropriate position to a fluid conduit 17 connected to a cooling fluid source, not shown. The chambers 12 and 13 are separated from each other by section walls 18 and 19, and the chamber 13 is provided with exhaust ports 20 and 21 adjacent the said section walls for exhausting the cooling fluid.

The engine is operated in the conventional manner by rotating the rotary piston 4 by firing the compressed gas with the spark plug 10 and the rotational movement of the piston is transmitted through the shaft 3. Strokes accomplishing gas suction, compression and exhaust of the products of gas combustion are performed by eccentric rotation of the piston 4, during which the apexes of the piston are in contact with the trochoid-shaped internal peripheral wall 2 of the casing 1 and move along the said wall, so that each crescent shaped air tight space formed between the internal face of the casing and the successive faces of the triangular rotary piston increases and decreases in volume. When one of the said spaces increases at the point where the inlet port 5 opens into the combustion chamber, the said space forms a gas suction chamber $a$ within into which the relatively cold gas coming from the carburetor 7 connected to a source of the fuel, not shown, and through the intake manifold 6 and the inlet port 5, is drawn. The suction stroke is followed by the compression and combustion of the gas effected by rotation of the piston and the ignition of the spark plug. Subsequent scavenging of the products of combustion product is through the exhaust port 8 and the manifold 9, and as it flows through the manifold intake 9, part of the heated exhaust gas is diverted through the branch passage 14 and flows through the chamber 12. The temperature of the local area of the casing which is exposed to the relatively low temperature incoming gas, is thereby raised. Localized contraction of the casing at the place where it is subjected to the cold intake gas is thus eliminated and simultaneously the gas in the suction chamber $a$ is preheated, thereby improving the combustibility of this gas. Exhausting of the heated gas flowing through the chamber 12 is through the outlet 15 and this gas is then conveyed away by a conventional means.

As shown in the accompanying drawing the outlet 15 may be provided with a manually or automatically operated valve means 16 for controlling the exhaust of the combustion product so that the heating temperature in the chamber 12 can be controlled. The remaining area of the casing which is exposed to the hot gases of combustion is cooled by supplying a cooling medium to the chamber 13 through the conduit 17, and exhausting the cooling medium through the ports 20 and 21.

As aforementioned, the casing 1 is usually closed by securing side walls, not shown, to the opposite ends of the casing for forming an air tight chamber therein. In this invention, the side walls may be provided with heating and cooling fluid chambers corresponding to the chambers 12 and 13 of the casing 1 and connected therewith so that the heating and cooling medium also acts upon the said side walls by circulating through the corresponding chambers therein which are connected to the chambers 12 and 13.

What is claimed is:

1. A rotary internal combustion engine having intake gas heating means, said engine comprising an engine casing having an annular trochoidal shaped internal peripheral wall, a crankshaft within said casing, a triangular shaped rotary piston mounted on said crankshaft for eccentric rotation within the casing, said piston having the apexes engaging the internal peripheral wall to define suction and compression spaces between the piston and the internal wall within said engine casing, said casing having a gas intake port and an exhaust port therein, an exhaust manifold connected to said casing over said exhaust port, and a jacket at least around the portion of said casing along which the suction space extends and defining a fluid chamber between said casing and said jacket, the end of said fluid chamber adjacent said intake port being connected to said exhaust manifold and said fluid chamber having an exhaust opening at the other end thereof, whereby a portion of the exhaust gases passing through the exhaust manifold are diverted through said fluid chamber for heating the engine casing along the suction space therein.

2. A rotary internal combustion engine as claimed in claim 1 and an exhaust valve in said exhaust opening at the other end of said fluid chamber for controlling the exhaust of exhaust gases from said fluid chamber.

References Cited by the Examiner

UNITED STATES PATENTS

| | | | |
|---|---|---|---|
| 1,790,812 | 2/1931 | Hall | 123—122 |
| 3,102,516 | 9/1963 | Gist | 123—8 |

FOREIGN PATENTS 943,693  12/1963  Great Britain.

MARK NEWMAN, *Primary Examiner.*

R. D. BLAKESLEE, *Assistant Examiner.*